United States Patent

Seipp, Jr. et al.

[11] Patent Number: 5,852,878
[45] Date of Patent: Dec. 29, 1998

[54] ELECTROLYTIC TILT SENSING DEVICE

[75] Inventors: Joseph J. Seipp, Jr., Levittown; William R. Keller, Churchville, both of Pa.

[73] Assignee: The Fredericks Company, Huntingdon Valley, Pa.

[21] Appl. No.: 892,075

[22] Filed: Jul. 14, 1997

[51] Int. Cl.⁶ .................................................. G01C 9/06
[52] U.S. Cl. ................................................................. 33/366
[58] Field of Search ........................ 33/366, 377; 73/505, 73/516 R, 516 LM

[56] References Cited

U.S. PATENT DOCUMENTS

| | | |
|---|---|---|
| 2,490,785 | 12/1949 | De Vany . |
| 2,711,590 | 6/1955 | Wilcox . |
| 2,936,411 | 5/1960 | Doty .......................................... 33/366 |
| 3,164,023 | 1/1965 | Holderer .................................... 33/366 |
| 3,171,213 | 3/1965 | Swarts et al. . |
| 3,604,275 | 9/1971 | Fox et al. . |
| 3,733,447 | 5/1973 | Schneider, Jr. . |
| 3,786,472 | 1/1974 | Scopacasa .................................. 33/366 |
| 3,823,486 | 7/1974 | Bhat et al. . |
| 3,852,890 | 12/1974 | Locklair et al. . |
| 3,946,494 | 3/1976 | Wells . |
| 3,992,951 | 11/1976 | Erspamer et al. . |
| 4,028,260 | 6/1977 | Zuest . |
| 4,244,117 | 1/1981 | Cantarella et al. . |
| 4,471,534 | 9/1984 | Fowler . |
| 4,583,296 | 4/1986 | Dell'Acqua . |
| 4,603,484 | 8/1986 | Strothmann . |
| 4,672,753 | 6/1987 | Kent et al. . |
| 4,676,103 | 6/1987 | Nakajima . |
| 4,795,868 | 1/1989 | Benjamin . |
| 4,811,491 | 3/1989 | Phillips et al. . |
| 4,846,954 | 7/1989 | Ryan et al. . |
| 4,937,518 | 6/1990 | Donati et al. . |
| 5,079,847 | 1/1992 | Swartz et al. . |
| 5,180,986 | 1/1993 | Swartz et al. . |
| 5,279,040 | 1/1994 | Kippelt et al. . |
| 5,381,604 | 1/1995 | Heidel et al. . |
| 5,612,679 | 3/1997 | Burgess . |
| 5,703,484 | 12/1997 | Bieberdorf et al. ....................... 33/366 |

FOREIGN PATENT DOCUMENTS

| | | | |
|---|---|---|---|
| 190832 | 8/1986 | European Pat. Off. ................. 33/366 |
| 546822 | 6/1993 | European Pat. Off. ................. 33/366 |
| 61-172008 | 8/1986 | Japan ....................................... 33/366 |
| 1-9309 | 1/1989 | Japan ....................................... 33/366 |
| WO 90/11489 | 10/1990 | WIPO ....................................... 33/366 |

*Primary Examiner*—G. Bradley Bennett
*Attorney, Agent, or Firm*—Dilworth & Barrese

[57] ABSTRACT

An electrolytic toroidal tilt sensing device for electrical coupling to a measuring circuit, wherein the measuring circuit is responsive to the device and adapted to provide an output signal indicative of the tilting and direction of tilting associated with the device, includes: an electrolytic fluid; a housing body having a channel formed therein for containing the electrolytic fluid, the housing body serving as a common electrode when coupled to the measuring circuit; and a cover plate having two working electrodes with at least one electrode serving as a working electrode when coupled to an appropriate measuring circuit, the cover plate being to hermetically fitted in the channel of the housing body such that the cover plate and the housing body form a chamber wherein at least one electrode is at least partially immersed in the electrolytic fluid contained within the chamber. Accordingly, when coupled to the measuring circuit, the device and, in particular, the electrolytic fluid's relationship to the electrodes exhibits at least one electrical property (e.g., impedance, conductance, capacitance, on/off condition, etc.) and a change therein when the device is tilted, the measuring circuit measuring such at least one electrical property and change therein through connection to the working electrode and the common electrode of the device and generating the output signal in response thereto.

75 Claims, 6 Drawing Sheets

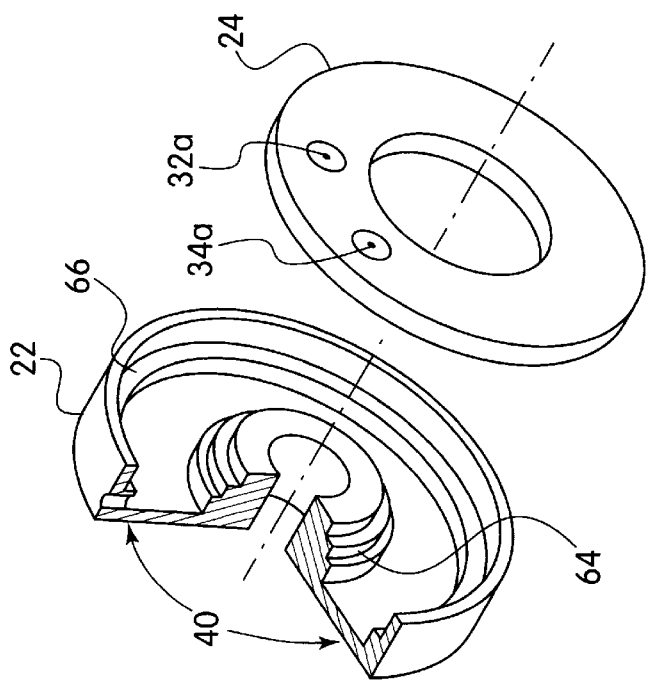
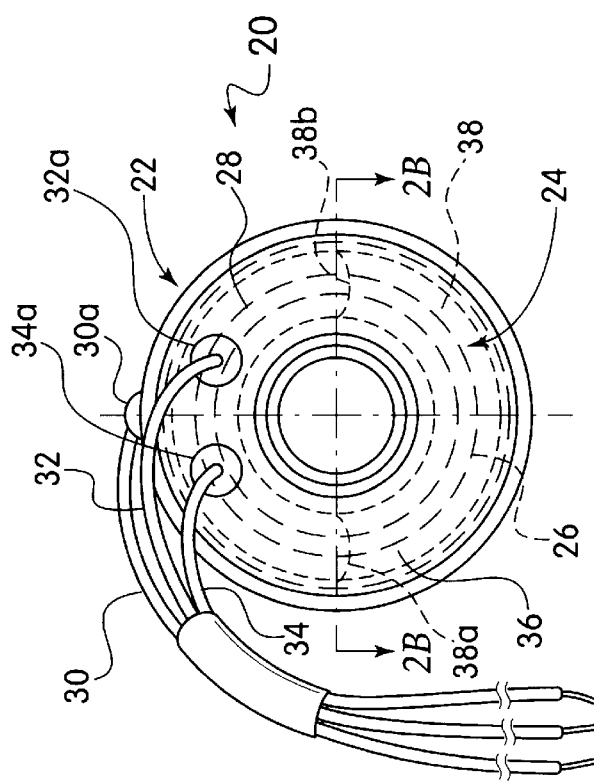
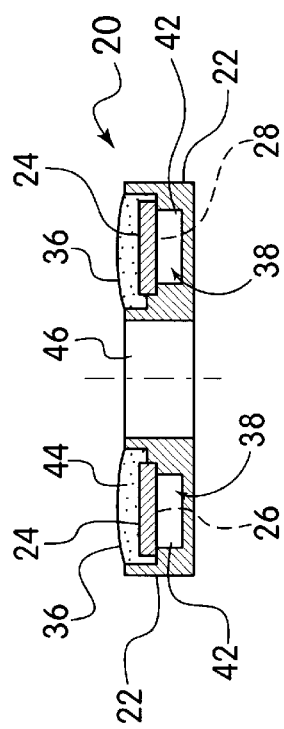

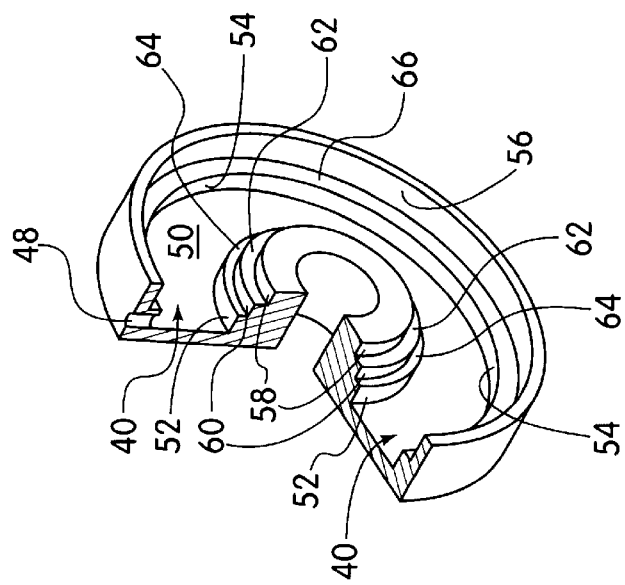
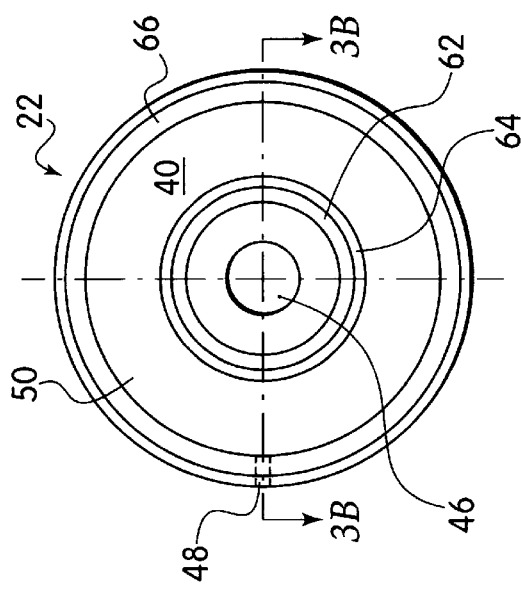
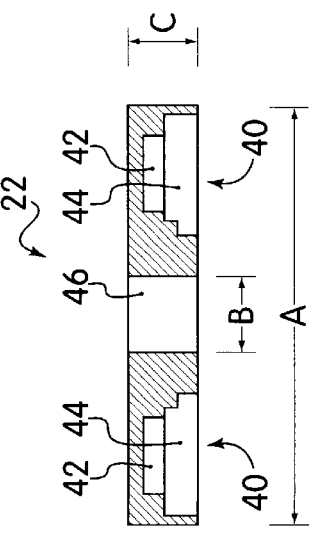

ELECTROLYTIC TILT SENSING DEVICE

BACKGROUND OF THE INVENTION

1. Field of the Invention

The present invention relates to electrolytic devices and, more particularly, to tilt sensing electrolytic devices and methods for fabricating same.

2. Description of the Related Art

Electrolytic tilt sensors are known in the art. Electrolytic tilt sensors include devices that change their electrical properties as a result of the interface of the electrolyte with electrodes contained therein when tilted. For example, known electrolytic tilt sensors may provide an output voltage proportional to the tilt angle, a phase indication of tilt direction and an acceleration associated with the tilt when the sensor is configured as part of an appropriate electrical circuit. In such an example, the output voltage derives from the impedance associated with the electrolyte (also referred to as the electrolytic solution or fluid) of the tilt sensor, which is a function of the tilt of the electrolyte due to gravitational or other forces.

FIG. 1 illustrates a typical tilt sensor 2 and a test (measuring) circuit 4 for deriving an output voltage signal proportional to the tilt angle. The sensor 2 includes a pair of working electrodes 6 and 8 and a common electrode 10 which are electrically connected to the test circuit 4 (e.g., a Wheatstone bridge) as shown. A resistance, which is a function of the electrolyte 11 contained in the sensor 2, is present between the working electrode 6 and the common electrode 10, as well as between the working electrode 8 and the common electrode 10. When the sensor is connected in the test circuit including an input voltage (e.g., 5 VAC) as shown and leveled, an equal resistance to the common electrode will exist and a voltmeter connected across the output (voltage out) of the measuring circuit will indicate a minimum (null) output. Tilting of the sensor will cause an unbalanced resistance with respect to the common electrode and, as a result, the output voltage will increase. While FIG. 1 illustrates a circuit which responds to the variation in resistance associated with the sensor, other electrical properties of the sensor (particularly, of the electrolyte) may be measured through connection with other appropriate circuits. Also, it is known that a tilt sensor may operate to provide an indication of a discrete condition (e.g., as a switch).

Tilt sensing devices, originally conceived for weapon delivery and aircraft navigation, have found a wide range of uses, including the monitoring of drill head angles in remote locations (such as wells) and the leveling of construction laser systems used in architectural alignment. This is primarily because the tilt sensor's voltage signal output may provide an input to a pre-programmed guidance or other system, or provide an indicia of tilt angle via an electrical signal at a location remote from the sensor.

It is also generally known that existing tilt sensors, such as the sensor shown in FIG. 1, may consist of a tubular or channelled glass envelope partially filled with the electrolytic fluid with conducting metal electrodes (working and common electrodes) formed therein. The envelope configuration, electrolyte, electrode arrangement and number of electrodes may be varied to provide desired operating characteristics. However, it is also known that many of such existing tilt sensors produce less than accurate outputs (e.g., less than accurate tilt indications) and/or suffer from stability problems caused by, for example, reactions between the electrolytic fluid and the electrodes. These shortcomings are typically due to fabrication techniques (e.g. electrode cleaning, electrode synunetry) and component and electrolyte choices.

As a result, it would be highly advantageous to provide an electrolytic tilt sensing device which substantially improves operational accuracy and stability as compared to prior art devices.

SUMMARY OF THE INVENTION

It is an object of the present invention to provide an electrolytic tilt sensing device having a two component construction whereby the first component is an insulated cover plate including at least one working electrode formed thereon and is sealingly coupled to the second component which is a precision channelled body with a channel formed therein for containing the electrolytic solution and whereby the housing body, itself, serves as the common electrode. These components, when hermetically sealed together, form the electrolytic sensor housing.

It is another object of the present invention to provide an electrolytic tilt sensing device including a common electrode housing component having a channel formed therein whereby the channel is formed via precision machining, precision stamping or in the case of plastics, precision molding.

It is yet another object of the present invention to provide an electrolytic tilt sensing device including an insulated cover plate component for sealingly engaging a housing body component, the insulated cover plate component having electrodes formed thereon via photo engraving, silk screening, stenciling, sputtering, hand painting or other known electrode application techniques.

It is still a further object of the present invention to provide an electrolytic tilt sensing device wherein the components of the device are fabricated from materials such as precious metals, non-precious metals, and/or non-precious metals plated with precious metals.

It is yet another object of the present invention to provide methods for manufacturing an electrolytic tilt sensing device formed in accordance with the present invention.

In one embodiment of the present invention, an electrolytic toroidal tilt sensing device for electrical coupling to an external measuring circuit, wherein the external measuring circuit is responsive to the device and adapted to provide an output signal indicative of a tilting associated with the device. The device includes: an electrolytic fluid (electrolyte); a housing body having a channel formed therein for containing the electrolytic fluid, the housing body serving as a common electrode when coupled to the measuring circuit; and a cover plate, the cover plate having at least one electrode (or more), dielectrically insulated from the housing body and each other, formed thereon. The electrode(s) serving as a working electrode(s) when coupled to the measuring circuit. The cover plate being hermetically sealed in the channel of the housing body such that the cover plate and the housing body form a chamber, wherein the at least one electrode is at least partially immersed in the electrolytic fluid contained within the chamber. Accordingly, when coupled to the external measuring circuit, the device and, in particular, the electrolytic fluid exhibits at least one electrical property (e.g., impedance, conductance, capacitance, on/off condition, etc.) with respect to the at least one electrode and a change therein when the device is tilted. The circuit measures the at least one electrical property and change therein. When the invention is rotated or tilted about its reference axis, the electrolytic fluid contained therein remains perpendicular to the centroid of the earth and the circumferential electrodes rotationally shift causing a change in the impedance between the electrodes. The appropriate electrical circuitry, to which the invention is attached, responds to a deviation from the null value of the regulated input voltage and generates a relative output signal.

Preferably, the electrolytic fluid is a conductive solution, such as an electrolyte, which is substantially non-aggressive (non-corrosive) to non-precious metals. Such a non-corrosive electrolyte may be alcohol-based and contain at least one conductive salt. Further, the housing body and the electrodes formed on the cover plate may preferably be comprised of a precious or non-precious metal. Alternatively, the housing body may be at least partially comprised of a metalized plastic. Still further, the channel formed in the housing is preferably precision machined, precision stamped or in the case of plastics, precision molded. Such housing body channel may also include a nesting groove for fittingly receiving the cover plate.

In addition, the cover plate may be comprised of ceramic material, plastic, glass or other dielectrically insulated materials; or, in an alternative form, be comprised of a metal disc having a dielectrically insulated coating (e.g. plastic, glass) formed thereon. In any case, the cover plate is to be electrically insulated from the housing. Further, one or more electrodes may be applied to the cover plate in any of several ways. Preferably, a silk screening technique or thin or thick film deposition may be used or, in an embodiment whereby the cover plate is fabricated as a printed circuit board, one or more electrodes may be photo engraved thereon. Other electrode application techniques may be used. It is to be appreciated that in a preferred embodiment, there are a pair of working electrodes formed on the cover plate.

Furthermore, the cover plate and the housing are sealed together hermetically. This seal may be provided by application of an adhesive material. In an alternative embodiment, at least a surface of the cover plate, which contacts the housing upon being fitted therewith, has a glass frit fired coating thereon and the housing is at least partially comprised of a metal such that a glass/metal seal is formed between the cover plate and the housing body upon application of a substantially high temperature.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 2A is a side elevation view of an electrolytic tilt sensing device formed in accordance with the present invention;

FIG. 2B is a cross sectional view of the inventive device of FIG. 2A, taken at section indicator 2B—2B;

FIG. 2C is an exploded partial perspective view of the inventive device of FIG. 2A;

FIG. 3A is a side elevation view of a housing body of a toroidal electrolytic tilt sensing device formed in accordance with the present invention for containment of the electrolytic fluid;

FIG. 3B is a cross sectional view of the inventive housing component of FIG. 3A, taken at section indicator 3B—3B;

FIG. 3C is a partial perspective view of the body component having a cut away to clarify the relationships of the intersecting surfaces integral to the body structure;

DETAILED DESCRIPTION OF PREFERRED EMBODIMENTS

Figure 1:
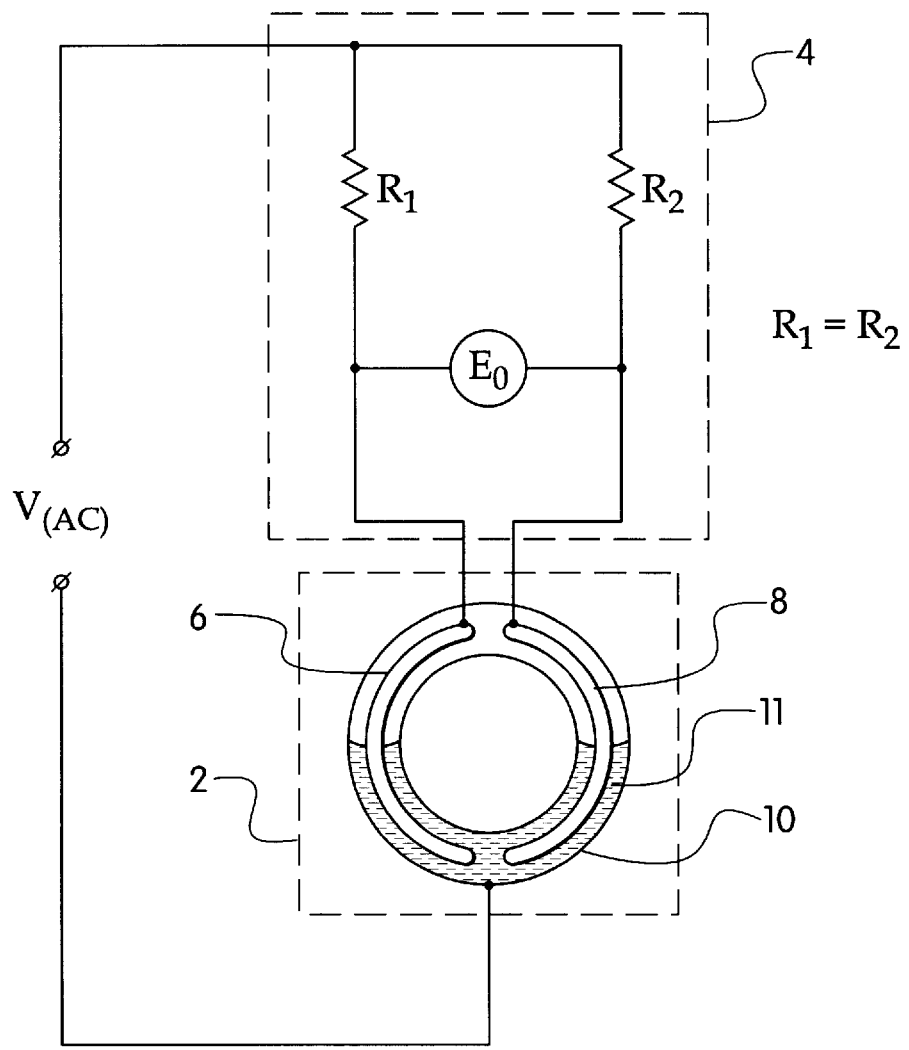
FIG. 1 is a schematic diagram of a conventional electrolytic tilt sensor electrically connected in a conventional measuring circuit.

Referring initially to FIG. 2A, an electrolytic tilt sensing device 20 according to the present invention is shown. The tilt sensing device 20 is basically formed utilizing a two-component construction. Specifically, the device 20 includes a housing body component 22 and an insulated cover plate component 24. The body structure 22 is formed of an appropriate metal having a toroidal channel formed as an integral feature of its sectional thickness. Said toroidal channel 40 opens into and joins with a second toroidal feature (cover plate) 24 which forms a toroidal chamber 42. Said toroidal channel 40 and cover plate 24, at their points of intersection, share concentric circular lands, 64 and 66, as indicated in FIG. 2B (the cross sectional illustration) and in FIG. 2C (the cut away and projection thereof). The housing body component 22, itself, uniquely serves the functions of containing an electrolytic solution as well as operating as a common electrode. The cover plate component 24 includes a pair of working electrodes 26 and 28 formed thereon which are dielectrically isolated from one another. The cover plate 24 is sealed to, but dielectrically isolated (i.e., insulated) from, the housing body component 22. The housing body component 22 and cover plate 24 form a housing when sealed together.

As mentioned, the device 20 contains an electrolytic solution which operates in conjunction with the working electrodes 26 and 28 of the insulated cover plate 24 and the common electrode housing body 22 and which produces a change in the device's electrical properties upon tilting of the device 20. When configured with a measuring circuit such as circuit 4 (FIG. 1), the fundamental output of the device 20 and circuit is an output voltage signal that is correlated to the tilt angle. Thus, in order for the device 20 to work accurately and reliably over time, all electrical parameters of the formed electrical circuit, such as the applied input voltage and the resistors within the circuit, must remain substantially stable over time. Most importantly, the impedance (e.g., resistance) of the electrolytic solution must remain stable in order for the output voltage to remain accurately correlated to the tilt angle. However, it is known that many electrochemical reactions that arise when a voltage is applied across a conductive fluid, such as an electrolyte, via metal electrodes give rise to an adverse change in impedance and, when used in conjunction with a tilt sensing device, a deviation in output voltage for a given tilt angle. Such deviation may be dangerous depending on the application in which the tilt sensing device is being employed (e.g., aircraft navigational system). It is known that such electrochemical reactions may occur between an electrolyte and an electrode formed from a non-precious metal.

As a result, the preferred electrolytic solution of the invention is a conductive fluid (e.g., an electrolyte) which is non-aggressive (i.e., non-corrosive) to materials which comprise the components of the device 20. It is to be appreciated that the portions of the components of the device 20 which come into operative contact with the electrolytic solution (i.e., the working electrodes and the common electrode housing body component) may be fabricated from precious metals (i.e., noble metals such as, for example, gold, platinum, etc.), non-precious metals (i.e., alloys and metals other than noble metals, for example, copper, nickel, brass, kovar, stainless steel, plated ferrous metals, etc.) or non-precious metals plated with precious metals. The preferred composition of the components of the invention, as well as preferred methods of manufacturing the same, will be described in detail later. However, it is important to appreciate the fact that the tilt sensing devices formed in accordance with the present invention may be fabricated from a wide range of materials and are advantageously not limited to the use of precious metals as have been used in the past. Rather, the tilt sensing devices of the invention may use non-precious metals without the significant shortcomings of component instability associated with the adverse reactions experienced between an electrochemical solution, such as an electrolyte, and materials such as non-precious metals.

Accordingly, in a preferred embodiment, the electrolytic solution may be an electrolyte which is alcohol-based and contains at least one conductive salt and which is non-aggressive to non-precious metals, such as the electrolytes disclosed in U.S. Pat. No. 5,612,679 (Burgess), issued on Mar. 18, 1997 and commonly owned by The Fredericks Company of Huntingdon Valley, Pa., the disclosure of which is incorporated herein by reference. However, it is to be understood that the tilt sensing devices of the present invention may utilize any known and suitable conductive fluid, such as an electrolyte, and may use any known and suitable conductive fluid, again such as an electrolyte, which is non-corrosive with respect to non-precious metals, when such metals are used to form the electrodes and/or housing body. For instance, the electrolytic fluid could be an ester-based electrolyte or other known alcohol/water electrolytes.

Furthermore, the tilt sensing device 20 as shown in FIG. 2A includes three conductive wires for electrical connection with a desired external circuit. The wires 30, 32 and 34 are respectively electrically connected to the common electrode housing body component 22 (at connection point 30A), working electrode 28 (at connection point 32A) and working electrode 26 (at connection point 34A). The wires 30, 32 and 34 may be connected to a circuit such as the measuring circuit 4 shown in FIG. 1 in order that an analog voltage output signal, corresponding to the angle of tilt experienced by the device 20 during operation, will be generated. Specifically, the degree of unbalance in impedance between the working electrodes 26 and 28 and the common electrode housing body component 22 due to the tilting of the device will change the electrical output from circuit 4. As is known, such an analog voltage output signal may be used by any particular system interested in the degree of tilt experienced by the device 20. As will be explained, due to the substantially semi-circular concentric fabrication of each of the working electrodes on the cover plate (FIGS. 4A & 4B), the toroidal device 20 provides an analog voltage output over a complete 360 degree range of tilt of the device 20. However, it is to be further appreciated that the tilt sensing device of the invention may include more or less external wire connections depending upon the electrical property (or properties) associated with the device 20 (e.g., impedance, conductance, capacitance, on/off condition, etc.) which is (are) being monitored by the desired external circuit. Also, instead of an analog output voltage signal, the device 20 may be used to provide an indication of a discrete occurrence (i.e. level condition and tilt condition, such as in the case of a tilt switch).

As mentioned, the housing body component 22 includes a channel 40, wherein the insulated cover plate 24 is fitted into, such that the two components may be sealed together to form a closed chamber 42 where the conductive solution 38 is contained. As is known, the chamber 42 is partially filled with fluid 38 so as to permit the fluid-changing interaction with the working electrodes to occur upon tilting of the device 20 in order to cause the responsive change in electrical property (e.g., impedance) monitored by the external circuit. The principle of the measurement of rotation is based on application of a VAC (AC voltage) excitation to the toroidal device. When applied, the output measuring voltage varies linearly with angular displacement about the normal axis, i.e., section indicator 2B-2B (FIG. 2A). The sensor theoretically operates in the manner of a potentiometer or variable resistor, with the electrolyte 38 acting as the wiper arm and the working electrodes as the resistive elements of the potentiometer. Rotating the sensor 22 (FIG. 2A) in the vertical plane, the fluid 38 of the sensor 20 settles to the lowest point of the closed toroidal chamber 42. This causes the resistance from the common electrode 22 to the working electrodes 26 and 28 to vary accordingly.

Further, the bond formed between the housing component 22 and the insulated cover plate 24 is a hermetic seal. Such seal may be provided in any known manner; however, in the embodiment illustrated in FIG. 2B, the seal is preferably formed utilizing a bonding material 36 such as an epoxy adhesive or equivalent (e.g., urethanes, phenolics, esters, PVC, acrylics, etc.). The bonding adhesive or equivalent material is preferably an epoxy or organic in composition, but may be inorganic (such as fired glass frit). Furthermore, as shown in the partially exploded view of FIG. 2C, the insulated cover plate 24 has a circular shape with a concentric opening in its center. The cover plate 24 is formed in such a complementary manner so that it may be fitted to cover channel 40, particularly, into a nesting groove 44 which forms a portion of the channel 40 of the housing body component 22. A detailed description of the insulated cover plate 24 will be provided below; however, the unique fabrication of the housing body component 22 will first be described.

As best shown in FIGS. 3A through 3C, the channel 40 of the housing body component 22 is preferably precision machined or stamped (or molded in the case of plastics) in order to form the fluid-containing chamber 42 and the nesting groove 44. The channel 40 is substantially circular in shape and concentrically positioned around a center opening 46 formed in the housing body 22. As previously mentioned, since the housing body component 22 serves as the common electrode of the tilt sensing device 20, the housing body is formed from a metal which may be a precious metal, a non-precious metal, or a non-precious metal plated with a precious metal. It may also be a metalized, formed plastic.

Nonetheless, the channel 40 is ultimately shaped to form the chamber 42 and the nesting groove 44; however, these functional areas of the channel are formed by precision machining, precision stamping or in the case of plastics, precision molding various circular inner and outer surfaces and circular connecting surfaces perpendicular to the inner and outer surfaces. It is to be understood that one skilled in the relevant art will appreciate the typical methods by which these surfaces may be precision machined, stamped or molded. Specifically, as best shown in FIG. 3C, the fluid-containing chamber 42 is defined by inner surface 52, outer surface 54 and connecting surface 50. The inner and outer surfaces 52 and 54 are concentrically equidistant with respect to one another and joined by connecting surface 50. On the other hand, the nesting groove 44 is defined by surface 56, inner surfaces 58 and 60 (respectively concentrically equidistant from outer surface 56) and connecting surfaces 62, 64 and 66. Specifically, the nesting groove is formed whereby surface 56 is perpendicularly connected to connecting surface 66, and inner surface 58, connecting surface 62, inner surface 60 and connecting surface 64, respectively form a sequence of perpendicular surfaces which define a stepped configuration, as best shown in FIGS. 3B and 3C.

It is to be understood that the surfaces of the channel 40 are precision formed by machining or stamping techniques or in the case of finished plastic, precision molded in order to produce precision dimension/smooth uniform surfaces. Such precision dimensions are important to the accuracy of the tilt sensing device because, as is known for instance in glass fabricated toroidal tilt sensors, any irregularities in the chamber where the electrolytic solution resides may cause electrical drift due to capillary action and liquid drag conditions in the vicinity of the irregularity. Electrical drift results in an inaccurate sensor output which, as mentioned before, may have dangerous consequences depending upon the application in which the device is employed.

Referring again to FIGS. 2C, 3A, 3B and 3C, it can be seen that the insulated cover plate 24 fits into the nesting groove 44 such that it rests on connecting surfaces 64 and 66 and the inner diameter of the cover plate is formed such that the inner surface of the cover plate abuts inner surface 60 of the housing. While the inner diameter of the cover plate 24 is formed so that the plate abuts inner surface 60; the outer diameter of the plate is chosen such that a gap is left between the outer surface of the plate and surface 56. Also, the height of the cover plate is such that it extends past inner surface 60 and approximately half the distance up inner surface 58. In this manner, bonding material 36 (FIG. 2B) may be placed in the nesting groove 44 (FIG. 3B) so that it settles between the exposed surfaces of the cover plate and the exposed surfaces of the nesting groove, as best shown in FIG. 2B.

A passageway 48 is formed in the housing component 22, from the exterior of the housing through outer surface 54, such that the electrolytic solution 38 may be placed in the chamber 42 formed by the two components of the device 20. After insertion of the solution 38, the passageway 48 may be hermetically sealed (e.g. plugged, solder, epoxy, etc.).

It should also be understood that while the common electrode housing body component 22 is preferably formed from a metal as explained above, the component may be formed from a combination of plastic and metal. The plastic portion is molded, solid phase formed or thermally formed to form channel 40 and the metal portion of such plastic resides within the channel to provide a common reference for the working electrodes. An example of a suitable plastic/metal combination would be the metalized plastics used for common plumbing fixtures or automotive components.

By way of example only, FIG. 3B provides a set of preferred overall dimensions for the housing body component 22. Referring to the letters used in FIG. 3A for the sake of clarity, it is to be appreciated that the following preferred dimensions are approximate dimensions and are in inches: A=0.875; B=between 0.156 and 0.260; C=0.150. It is to be understood that the above dimensions are merely exemplary in nature and, therefore, tilt sensing devices which are fabricated according to the unique teachings described herein may be larger or smaller in size and still provide the significant advantages over prior art devices.

Figure 4A:
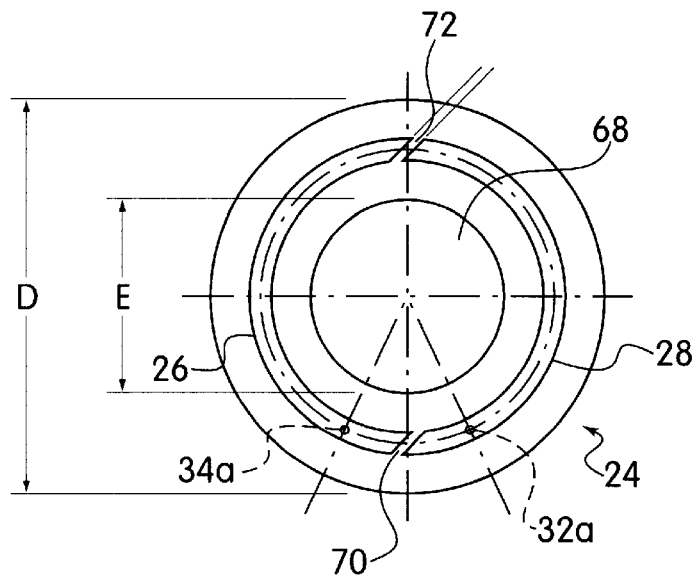
FIG. 4A is a side elevation view of the dielectric surface of the cover plate having the measuring electrodes situated thereon in accordance with the present invention.

Referring now to FIG. 4A, a preferred form of the insulated cover plate 24 is shown. The cover plate 24 may be formed from a ceramic material, although other electrically insulating materials may be used. The plate is disc-shaped with a concentric opening 68 formed at its center. The cover plate is formed in this shape in order to provide a complementary fit with the housing body component 22, as explained above. The working electrodes 26 and 28 are each substantially semi-circular in shape and separated by insulating gaps 70 and 72 to form separate electrodes. The gaps 70 and 72 between electrodes may be diagonal or stepped in shape rather than a straight vertical split as shown. The electrodes are concentrically formed on one side of the cover plate in such a way so as not to contact the housing body 22 or each other when the cover plate 24 is fitted into the nesting groove 44. In other words, the electrodes are dielectrically spaced enough of a distance from the opening 68 and enough of a distance from the outer surface of the plate such that when the plate rests on connecting surfaces 64 and 66 of the housing body 22, the electrodes do not contact any surface of the housing body so as not to cause a shorting condition.

There are several methods of forming the working electrodes 26 and 28 on the cover plate 24. Such methods may include, but are not limited to: silk screening, stenciling, sputtering, handpainting, thin and thick film deposition, cut bonded metal strips and photo engraving using printed circuit board technology. Preferably, the electrodes are formed using a technique whereby the electrodes are symmetrically placed, uniform and smooth in order to avoid irregularities, as mentioned above, in the electrolytic solution channel. Silk screening, stenciling and photo engraving would accomplish this task; however, careful sputtering or handpainting or any other appropriate application technique may do the same.

In one embodiment, the cover plate 24 may be formed as a printed circuit board whereby the electrodes are photo engraved and the connection points 32A and 34A (FIG. 2C) may include plated through holes that extend from the electrodes and through the insulating material to the side of the cover plate opposite the side with the electrodes. This allows the external connecting wires 32 and 34 to be electrically connected to the electrodes from the opposite side of the cover plate (i.e., the side that is covered with bonding material). While such a non-through edge electrical termination is preferred, through edge electrical termination would still be satisfactory. Solder filling the plated through holes by wave soldering or any other suitable technique serves to seal these holes.

In another embodiment, the insulated cover plate 24 may be formed from a metal disc (preferably, stainless steel) glazed with a glass frit fired coating. The glass frit fired coating provides the insulation between the stainless steel disc and the housing body component 22 when the cover plate is fitted onto the housing body component. The working electrodes 26 and 28 may be formed on the glass frit coating, as shown in FIG. 4A, in any of the suitable methods mentioned above, e.g., silk screening, stenciling, sputtering, handpainting. Similar to the insulated cover plates described above, formed as a printed circuit board or from the ceramic material, the glass frit fired coated stainless steel disc may be sealed with the housing body component by the bonding material 36. As an alternative, the glass frit fired coated stainless steel disc may be sealed to the housing component by forming a glass (cover plate) to metal (housing body) seal. This bonding technique may be accomplished at a high temperature by employing RF equipment within a vacuum or inert gas environment. It is also possible to glass frit coat the ceramic cover plate embodiment (prior to applying the electrodes) so that a similar glass/metal seal is formed.

FIG. 4A provides a set of preferred overall dimensions for the insulated cover plate component 24. Referring to the letters used in FIG. 4A for the sake of clarity, it is to be appreciated that the following preferred dimensions are approximate dimensions and are in inches: D=0.785; and E=0.385. The preferred thickness of the cover plate may be approximately 0.040 inches. It is to be understood that the above dimensions are merely exemplary in nature and, therefore, tilt sensing devices which are fabricated according to the unique teachings described herein may be larger or smaller in size and still provide the significant advantages over prior art devices.

Figure 4B:
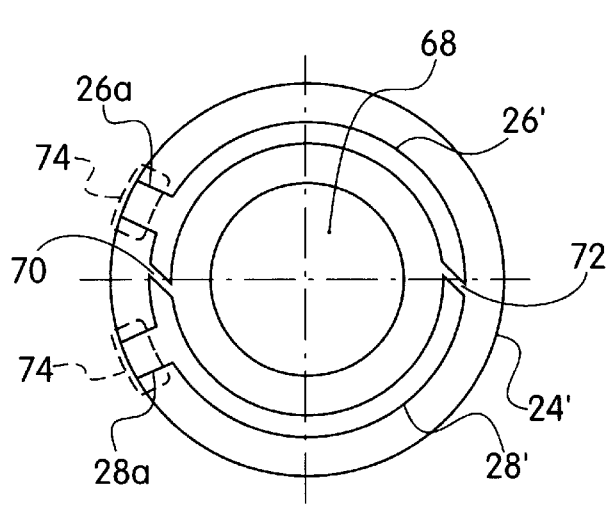
FIG. 4B is a side elevation view of another form of the electrodes situated on the cover plate in accordance with the present invention.
Figure 4C:
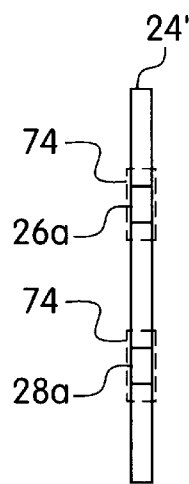
FIG. 4C is a quarter-turn side elevation view of the cover plate of FIG. 4B.
Figure 4D:
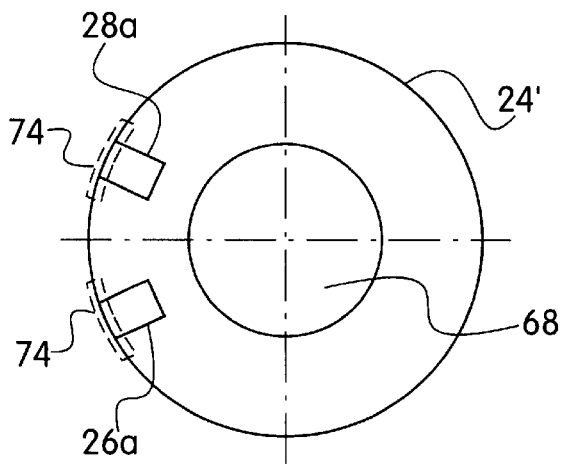
FIG. 4D is an opposite side elevation view of the cover plate of FIG. 4B.

Referring now to FIGS. 4B through 4D, another configuration for forming working electrodes 26' and 28' on a cover plate 24' is shown. When plated through holes (such as, for example, 32A and 34A in FIG. 4A) are not employed, the configuration shown in FIGS. 4B through 4D may be utilized to permit wires 32 and 34 to be attached to the working electrodes of the device of the present invention. Specifically, electrodes 26' and 28' each have a terminal portion 26A and 28A, respectively, connectively extending therefrom. The terminal portions extend from the electrodes on the side of the cover plate 24' which faces the chamber 42 of the housing body 22 (FIG. 4B), around the edge of the cover plate (FIG. 4C), such that they wrap around to the side opposite the side which faces the chamber 42 (FIG. 4D). This configuration permits the wires 32 and 34 to be respectively attached to the terminal portions 26A and 28A on the side of the cover plate not facing the chamber 42 (FIG. 4D). However, since the cover plate 24' comes into contact with the metal surfaces of the housing body 22, a glass frit is applied over the areas of the terminal portions 26A and 28A that would otherwise contact the housing body 22. The glass frit is then fired to produce a glass coating 74 which serves to electrically insulate the terminal portions 26A and 28A from the housing body 72 when the cover plate and housing body are combined to form the device housing.

An exemplary and generalized process for manufacturing the toroidal tilt sensing device of the present invention will now be described. First, the insulated cover plate may be fabricated which includes preparing the insulated portion (e.g., ceramic disc, glass frit coated metal disc) and applying working electrodes thereto (e.g., silk screening, stenciling, sputtering, handpainting, etc.) or, if employing the printed circuit board embodiment, photo engraving the electrodes onto the insulating material. Next, the common electrode housing body component may be fabricated which includes precision machining (metal), stamping (metal), or molding (plastic) the housing material and, if a metal/plastic combination, metalizing the plastic in order to provide a conductive surface to allow common electrode operation. Next, any through holes are soldered or blocked and, following this step, the soldered or blocked areas located on the interior surfaces are masked with an epoxy/glass glaze. Thereafter, the insulated cover plate component and the common electrode housing body component are cleaned. Next, adhesive is applied to the surfaces of the common electrode housing body component that will contact the insulated cover plate. The two components are then assembled such that the cover plate is placed in the nesting groove. Epoxy adhesive is applied over the cover plate in the nesting groove. Next, the epoxy is cured. The wires (for connecting the device to the external circuit) are then attached to the connection points on the cover plate and the metal housing body. Then, once electrically connected, the leads of the wires are epoxy bonded to the device for strain relief. Lastly, the electrolytic solution is placed in the device through the passageway formed in the housing and the passageway is hermetically sealed.

Figure 5A:
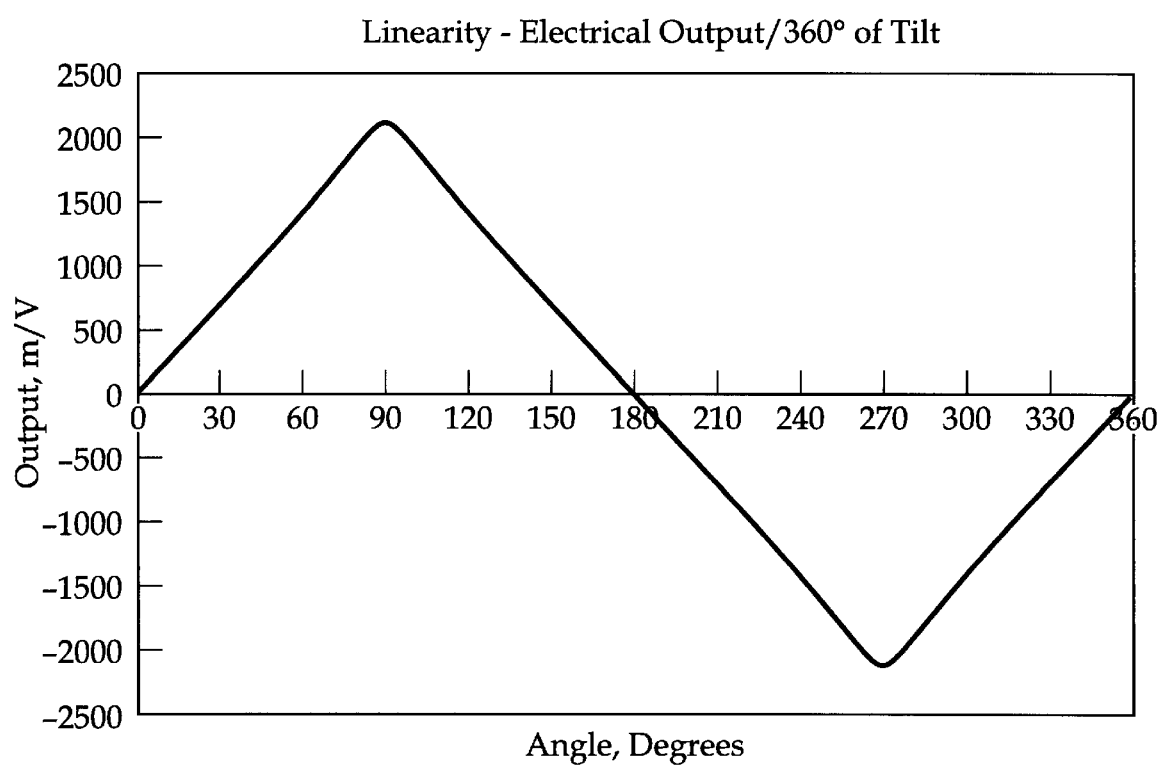
FIG. 5A is a graphical linearity representation of the output voltage (millivolts) versus tilt angle (degrees) associated with an electrolytic tilt sensing device formed in accordance with the present invention.
Figure 5B:
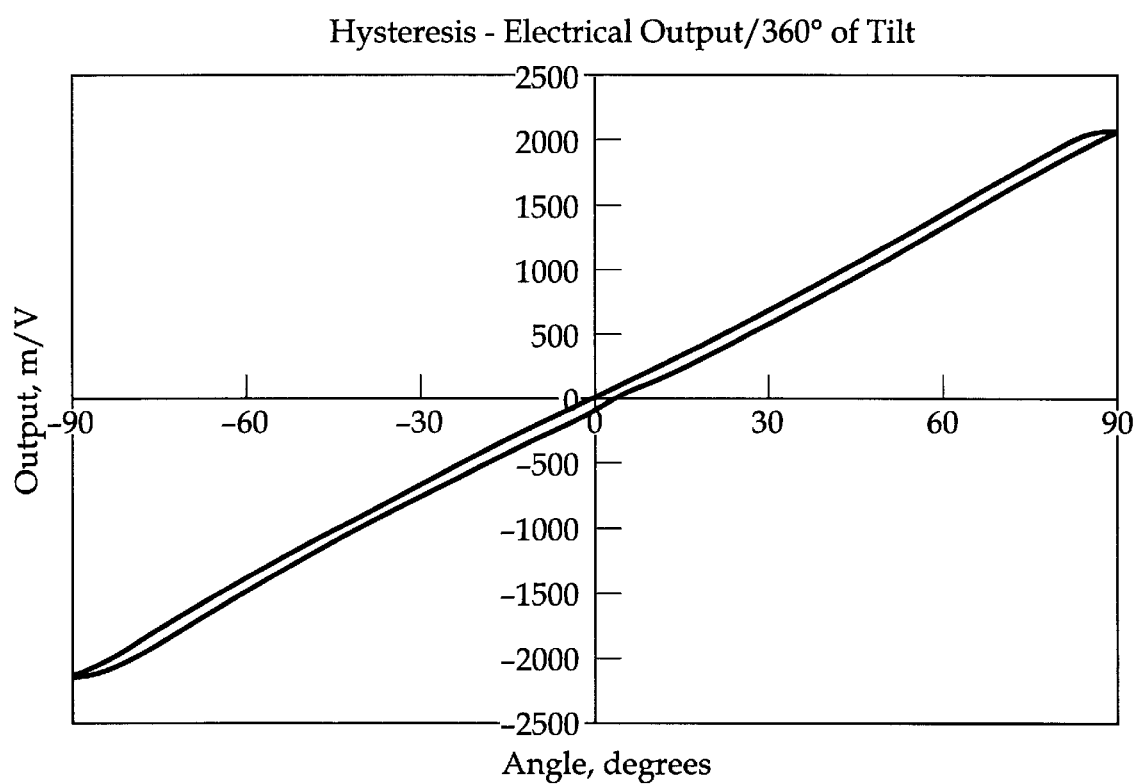
FIG. 5B is a graphical hysteresis representation of the output voltage (millivolts) versus tilt angle (degrees) associated with an electrolytic tilt sensing device formed in accordance with the present invention.

Referring now to FIGS. 5A and 5B, exemplary graphical representations of certain performance characteristics of a toroidal tilt sensing device of the invention are shown. In particular, FIG. 5A illustrates an example of the improved linearity associated with an analog voltage output signal produced by a toroidal tilt sensing device formed as described herein and connected to a measuring circuit such as circuit 4 (FIG. 1). The graph plots output voltage in millivolts (mV) versus tilt angle in degrees. Likewise, FIG. 5B illustrates an example of the corresponding hysteresis response associated with the inventive tilt sensing device. Again, the graph plots output voltage in millivolts versus tilt angle in degrees. As is evident from the graphs of FIGS. 5A and 5B, the output response of a device and measuring circuit formed according to the teachings disclosed herein is substantially linear and, therefore, predictable. Such a response is significantly attributable to the above-described methods of forming the housing body and insulated cover plate components of the invention which provide for symmetry, uniformity and smoothness in the fluid-containing channel of the device. Therefore, the device of the invention significantly reduces the occurrence of electrical drift due to irregularities and anomalous electrolytic cell behavior known in the art and, as a result, may be used in applications which require a stable and precise output indication of tilt angle.

Although the illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An electrolytic toroidal tilt sensing device for electrical coupling to an external measuring circuit, the external measuring circuit being responsive to the device and adapted to provide an output signal indicative of a tilting associated with the device, the device comprising:

an electrolytic fluid;

a housing body having a precision formed channel therein for containing the electrolytic fluid, the housing body serving as a common electrode when coupled to the measuring circuit; and a cover plate having at least one electrode formed thereon serving as a working electrode when coupled to the measuring circuit, the cover plate being hermetically sealed into the channel of the housing such that the cover plate and the housing form a chamber wherein the at least one electrode is at least partially immersed in the electrolytic fluid contained within the chamber;

when coupled to the external measuring circuit, the electrolytic fluid exhibiting at least one electrical property with respect to the at least one electrode and a change therein when the device is tilted, the measuring circuit measuring such at least one electrical property and change therein through connection to the working electrode and the common electrode of the toroidal tilt device and generating the output signal in response thereto.

2. The device of claim 1, wherein the electrolytic fluid is a stable conductive solution.

3. The device of claim 1, wherein the electrolytic solution is substantially non-aggressive to non-precious metals.

4. The device of claim 1, wherein the electrolytic fluid is an electrolyte.

5. The device of claim 4, wherein the electrolyte is alcohol-based and contains at least one conductive salt.

6. The device of claim 4, wherein the electrolyte is ester-based.

7. The device of claim 1, wherein the housing body is at least partially comprised of a non-precious metal.

8. The device of claim 1, wherein the housing body is at least partially comprised of a precious metal.

9. The device of claim 1, wherein the housing body is at least partially comprised of a non-precious metal plated with a precious metal.

10. The device of claim 1, wherein the housing body is at least partially comprised of a metalized plastic.

11. The device of claim 1, wherein the channel formed in the housing body is a precision machined channel.

12. The device of claim 1, wherein the channel formed in the housing body is a precision stamped channel.

13. The device of claim 1, wherein the channel formed in the housing body is a precision molded channel.

14. The device of claim 1, wherein the channel formed in the housing body further includes a nesting groove for fittingly receiving the cover plate.

15. The device of claim 1, wherein the housing body further includes a passageway formed from the exterior of the housing body to the chamber of the housing body for partially filling the chamber with the electrolytic fluid.

16. The device of claim 1, wherein the cover plate is at least partially comprised of a ceramic material.

17. The device of claim 1, wherein the cover plate is comprised of a metal disc having a glass frit fired electrical insulating coating formed thereon.

18. The device of claim 1, wherein the at least one electrode is applied to the cover plate using a silk screening technique.

19. The device of claim 1, wherein the at least one electrode is applied to the cover plate using a stenciling technique.

20. The device of claim 1, wherein the at least one electrode is applied to the cover plate using a sputtering technique.

21. The device of claim 1, wherein the at least one electrode is applied to the cover plate using a hand painting technique.

22. The device of claim 1, wherein the at least one electrode is applied to the cover plate using a thick and thin film deposition technique.

23. The device of claim 1, wherein the at least one electrode is applied to the cover plate using a cut bonded metal strip application technique.

24. The device of claim 1, wherein the at least one electrode is at least partially comprised of a non-precious metal.

25. The device of claim 1, wherein the at least one electrode is at least partially comprised of a precious metal.

26. The device of claim 1, wherein the at least one electrode is at least partially comprised of a non-precious metal plated with a precious metal.

27. The device of claim 1, wherein the at least one electrode is substantially formed on a first side of the cover plate and includes a terminal portion which extends to a second side of the cover plate, opposite the first side, for electrical connection to the measuring circuit.

28. The device of claim 27, further including a glass frit fired coating formed substantially over the terminal portion to prevent the terminal portion from electrically contacting the housing body.

29. The device of claim 1, further including a second electrode serving as another working electrode when coupled to the measuring circuit.

30. The device of claim 29, wherein the two electrodes are each substantially semicircular in shape, formed concentrically on a first side of the cover plate, and dielectrically isolated from one another.

31. The device of claim 30, wherein the cover plate further includes plated through holes passing from the first side of the cover plate to a second side of the cover plate, opposite the first side, and which are connected to the electrodes on the first side of the plate in order to provide respective electrical connection points on the second side of the cover plate for the measuring circuit.

32. The device of claim 1, wherein the cover plate is comprised of a printed circuit board.

33. The device of claim 32, wherein the at least one electrode is formed on the cover plate by a photo engraving technique.

34. The device of claim 1, wherein the cover plate and the housing body are hermetically sealed together by one of an inorganic and organic adhesive material.

35. The device as defined in claim 1, wherein at least a surface of the cover plate, which contacts the housing body upon being fitted therewith, has a glass frit fired coating thereon and the housing body is at least partially comprised of a metal such that a glass/metal seal is formed between the cover plate and the housing body upon application of a substantially high temperature.

36. An electrical circuit comprising:
a measuring circuit;
an electrolytic toroidal tilt sensing device coupled to the measuring circuit, the electrolytic toroidal tilt sensing device including:
an electrolytic fluid;
a housing body having a channel formed therein for containing the electrolytic fluid, the housing body serving as a common electrode of the toroidal tilt sensor; and
a cover plate having at least one dielectrically insulated electrode formed thereon serving as a working electrode of the sensor, the cover plate being hermetically sealed into the channel of the housing body such that the cover plate and the housing body form a chamber wherein the at least one electrode is at least partially immersed in the electrolytic fluid contained within the chamber;

the electrolytic fluid exhibiting at least one measurable electrical property with respect to the at least one electrode and a change therein when the device is tilted, the measuring circuit measuring such at least one measurable electrical property and change therein through the working electrode and the common electrode and generating an output signal indicative of the tilting of the device in response thereto.

37. The electrical circuit of claim 36, wherein the output signal is an analog voltage output signal.

38. The electrical circuit of claim 37, wherein the analog voltage correlates to a tilt angle associated with the electrolytic tilt sensing device.

39. The electrical circuit of claim 36, wherein the output signal is a discrete voltage output signal.

40. The electrical circuit of claim 39, wherein the discrete output voltage correlates to the existence of one of a tilt condition and a level condition associated with the electrolytic tilt sensing device.

41. The electrical circuit of claim 36, wherein the electrolytic tilt sensing device may be located within a tilt-sensitive system and the output signal may be provided to the system to indicate tilting thereof.

42. The electrical circuit of claim 36, wherein the output signal provides indication of approximately a 360 degree range of tilt.

43. An electrolytic toroidal tilt sensing device for electrical coupling to an external measuring circuit, the external measuring circuit being responsive to the device and adapted to provide an output signal indicative of a tilting associated with the device, the device comprising:

an electrolytic fluid;

a housing body having a precision formed channel therein for containing the electrolytic fluid, the housing body serving as a common electrode when coupled to the measuring circuit; and a cover plate having a pair of dielectrically isolated substantially semi-circular electrodes formed thereon respectively serving as working electrodes when coupled to the measuring circuit, the cover plate being hermetically sealed into the channel of the housing body such that the cover plate and the housing body form a chamber wherein the at least one of the pair of electrodes is at least partially immersed in the electrolytic fluid contained within the chamber;

when coupled to the external measuring circuit, the electrolytic fluid exhibiting at least one electrical property with respect to the electrodes and a change therein when the device is tilted, the measuring circuit measuring such at least one electrical property and change therein through connection to the working electrodes and the common electrode of the device and generating the output signal in response thereto.

44. The device of claim 43, wherein the electrolytic fluid is substantially non-aggressive to non-precious metals.

45. The device of claim 43, wherein the electrolytic fluid is alcohol-based and contains at least one conductive salt.

46. The device of claim 43, wherein the electrolytic fluid is ester-based.

47. The device of claim 43, wherein the housing body is at least partially comprised of a non-precious metal.

48. The device of claim 43, wherein the housing body is at least partially comprised of a precious metal.

49. The device of claim 43, wherein the housing body is at least partially comprised of a non-precious metal plated with a precious metal.

50. The device of claim 43, wherein the housing body is at least partially comprised of a metalized plastic.

51. The device of claim 43, wherein the channel formed in the housing body is a precision machined channel.

52. The device of claim 43, wherein the channel formed in the housing body is a precision stamped channel.

53. The device of claim 43, wherein the channel formed in the housing body is a precision molded channel.

54. The device of claim 43, wherein the channel formed in the housing body further includes a nesting groove for fittingly receiving the cover plate.

55. The device of claim 43, wherein the housing body further includes a passageway formed from the exterior of the housing body to the chamber of the housing body for partially filling the chamber with the electrolytic fluid.

56. The device of claim 43, wherein the cover plate is at least partially comprised of a ceramic material.

57. The device of claim 43, wherein the cover plate is comprised of a metal disc having a glass frit fired insulating coating formed thereon.

58. The device of claim 43, wherein the working electrodes are applied to the cover plate using a silk screening technique.

59. The device of claim 43, wherein the working electrodes are applied to the cover plate using a stenciling technique.

60. The device of claim 43, wherein the working electrodes are applied to the cover plate using a sputtering technique.

61. The device of claim 43, wherein the working electrodes are applied to the cover plate using a hand painting technique.

62. The device of claim 43, wherein the working electrodes are applied to the cover plate using a thick and thin film deposition technique.

63. The device of claim 43, wherein the working electrodes are applied to the cover plate using a cut bonded metal strip application technique.

64. The device of claim 43, wherein the working electrodes are at least partially comprised of a non-precious metal.

65. The device of claim 43, wherein the working electrodes are at least partially comprised of a precious metal.

66. The device of claim 43, wherein the working electrodes are at least partially comprised of a non-precious metal plated with a precious metal.

67. The device of claim 43, wherein the electrodes are substantially formed on a first side of the cover plate and include respective terminal portions which extend to a second side of the cover plate, opposite the first side, for electrical connection to the measuring circuit.

68. The device of claim 67, further including a glass frit fired coating formed substantially over each terminal portion to prevent each terminal portion from electrically contacting the housing body.

69. The device of claim 43, wherein the substantially semi-circular shaped working electrodes are formed concentrically on a first side of the cover plate.

70. The device of claim 69, wherein the cover plate further includes plated through holes passing from the first side of the cover plate to a second side of the cover plate, opposite the first side, and which are connected to the electrodes on the first side of the plate in order to provide respective electrical connection points on the second side of the cover plate for the measuring circuit.

71. The device of claim 43, wherein the cover plate is comprised of a printed circuit board.

72. The device of claim 71, wherein the working electrodes are formed on the cover plate by a photo engraving technique.

73. The device of claim 43, wherein the cover plate and the housing are sealed together by one of an inorganic and organic adhesive material.

74. The device of claim 43, wherein at least a surface of the cover plate, which contacts the housing body upon being fitted therewith, has a glass frit fired coating thereon and the housing body is at least partially comprised of a metal such that a glass/metal seal is formed between the cover plate and the housing body upon application of a substantially high temperature.

75. The device of claim 43, wherein the at least one electrical property is an impedance.

* * * * *